(12) United States Patent
Yamamoto

(10) Patent No.: US 11,929,503 B2
(45) Date of Patent: Mar. 12, 2024

(54) POSITIVE ELECTRODE FOR SECONDARY BATTERY AND SECONDARY BATTERY

(71) Applicant: Prime Planet Energy & Solutions, Inc., Tokyo (JP)

(72) Inventor: Yuji Yamamoto, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 183 days.

(21) Appl. No.: 17/400,180

(22) Filed: Aug. 12, 2021

(65) Prior Publication Data

US 2022/0059838 A1 Feb. 24, 2022

(30) Foreign Application Priority Data

Aug. 20, 2020 (JP) ................... 2020-139131

(51) Int. Cl.
*H01M 4/583* (2010.01)
*H01M 4/36* (2006.01)
*H01M 4/64* (2006.01)
*H01M 10/02* (2006.01)
*H01M 4/02* (2006.01)

(52) U.S. Cl.
CPC .......... *H01M 4/583* (2013.01); *H01M 4/366* (2013.01); *H01M 4/64* (2013.01); *H01M 10/02* (2013.01); *H01M 2004/028* (2013.01)

(58) Field of Classification Search
CPC .......... H01M 4/58; H01M 4/583; H01M 4/36; H01M 4/30
See application file for complete search history.

(56) References Cited

U.S. PATENT DOCUMENTS

2007/0231705 A1* 10/2007 Ohzuku ............... H01M 4/525
429/339
2011/0217594 A1* 9/2011 Awano ............... H01M 4/1391
429/232

(Continued)

FOREIGN PATENT DOCUMENTS

CN 101809790 A 8/2010
CN 108878888 A 11/2018

(Continued)

*Primary Examiner* — Kenneth J Douyette
(74) *Attorney, Agent, or Firm* — HAUPTMAN HAM, LLP

(57) ABSTRACT

Provided is a positive electrode for a secondary battery in which carbon nanotubes are used, of which an initial resistance is small, and that suppresses an increase in resistance when charging and discharging are repeated. The positive electrode for a secondary battery disclosed herein includes a positive-electrode current collector and a positive-electrode active material layer provided on the positive-electrode current collector. The positive-electrode active material layer contains a positive-electrode active material and carbon nanotubes, and substantially does not contain a resin binder. The positive-electrode active material layer includes a layer-like region that is in contact with the positive-electrode current collector, and a region other than the layer-like region. Both of the layer-like region and the region other than the layer-like region contain carbon nanotubes. A content of carbon nanotubes in the layer-like region is larger than a content of carbon nanotubes in the region other than the layer-like region.

4 Claims, 3 Drawing Sheets

(56) References Cited

U.S. PATENT DOCUMENTS

| | | | |
|---|---|---|---|
| 2012/0077035 A1* | 3/2012 | Spahr | C09D 5/24 |
| | | | 252/502 |
| 2012/0328940 A1* | 12/2012 | Bosnyak | B82Y 30/00 |
| | | | 524/576 |
| 2013/0147439 A1 | 6/2013 | Takahashi | |
| 2015/0364750 A1 | 12/2015 | Maheshwari et al. | |
| 2016/0036059 A1 | 2/2016 | Tokune et al. | |
| 2019/0172604 A1 | 6/2019 | Hashimoto et al. | |
| 2019/0312259 A1 | 10/2019 | Baek et al. | |

FOREIGN PATENT DOCUMENTS

| | | |
|---|---|---|
| CN | 109196687 A | 1/2019 |
| CN | 110073524 A | 7/2019 |
| EP | 3370279 A1 | 9/2018 |
| JP | 2012-174401 A | 9/2012 |
| JP | 2013120736 A | 6/2013 |
| JP | 2014238944 A | 12/2014 |
| JP | 2016-4786 A | 1/2016 |
| JP | 2016-31922 A | 3/2016 |
| JP | 2017-182989 A | 10/2017 |
| WO | 2017/199884 A1 | 11/2017 |
| WO | 2019/168035 A1 | 9/2019 |

\* cited by examiner

POSITIVE ELECTRODE FOR SECONDARY BATTERY AND SECONDARY BATTERY

BACKGROUND OF THE INVENTION

1. Field of the Invention

The present disclosure relates to a positive electrode for a secondary battery. The present disclosure also relates to a secondary battery that includes the positive electrode. It should be noted that the present application claims priority based on Japanese Patent Application No. 2020-139131 filed on Aug. 20, 2020, the entire contents of which are incorporated herein by reference.

2. Description of the Related Art

In recent years, secondary batteries such as lithium-ion secondary batteries are suitably used for portable power supplies in personal computers, portable terminals, and the like and vehicle driving power supplies in electric vehicles (EVs), hybrid vehicles (HVs), plug-in hybrid vehicles (PHVs) and the like.

A positive electrode that is used in a secondary battery such as a lithium-ion secondary battery commonly has a configuration in which a positive-electrode active material layer is provided on a positive-electrode current collector. The positive-electrode active material layer commonly contains a positive-electrode active material, a conductive material, and a resin binder. However, the resin binder has an insulating property, and accordingly functions as a resistive component in the positive electrode. With regard to this, WO 2017/199884 and Japanese Patent Application Publication No. 2016-31922 describe eliminating a resin binder from the positive-electrode active material layer to reduce resistance of the positive electrode, by allowing the positive-electrode active material layer to contain carbon nanotubes, which are a conductive component and function as both a conductive material and a binder.

SUMMARY OF THE INVENTION

However, the inventor of the present disclosure carried out intensive studies and found that the conventional technologies described above have a problem in that resistance of the positive electrode is not sufficiently reduced and the resistance largely increases when charging and discharging are repeated.

Therefore, an object of the present disclosure is to provide a positive electrode for a secondary battery in which carbon nanotubes are used, of which an initial resistance is small, and that suppresses an increase in resistance when charging and discharging are repeated.

A positive electrode for a secondary battery disclosed herein includes a positive-electrode current collector and a positive-electrode active material layer that is provided on the positive-electrode current collector. The positive-electrode active material layer contains a positive-electrode active material and carbon nanotubes, and substantially does not contain a resin binder. The positive-electrode active material layer includes a layer-like region that is in contact with the positive-electrode current collector, and a region other than the layer-like region. Both of the layer-like region and the region other than the layer-like region contain carbon nanotubes. A content of carbon nanotubes in the layer-like region is larger than a content of carbon nanotubes in the region other than the layer-like region. Provided with this configuration is a positive electrode for a secondary battery in which carbon nanotubes are used, of which an initial resistance is small, and that suppresses an increase in resistance when charging and discharging are repeated.

In a desired aspect of the positive electrode for a secondary battery disclosed herein, the content of carbon nanotubes in the layer-like region is at least 3 mass % and no greater than 10 mass %. With this configuration, more increased effect of reducing the resistance and more increased effect of suppressing an increase in the resistance can be achieved.

In a desired aspect of the positive electrode for a secondary battery disclosed herein, a thickness of the layer-like region is at least 5% and no greater than 20% of a thickness of the positive-electrode active material layer. With this configuration, more increased effect of reducing the resistance and more increased effect of suppressing an increase in the resistance can be achieved.

A secondary battery disclosed herein is a secondary battery that includes the positive electrode for a secondary battery described above. Provided with this configuration is a secondary battery that has small initial resistance and in which an increase in the resistance is suppressed when charging and discharging are repeated.

DESCRIPTION OF THE PREFERRED EMBODIMENTS

Figure 1:
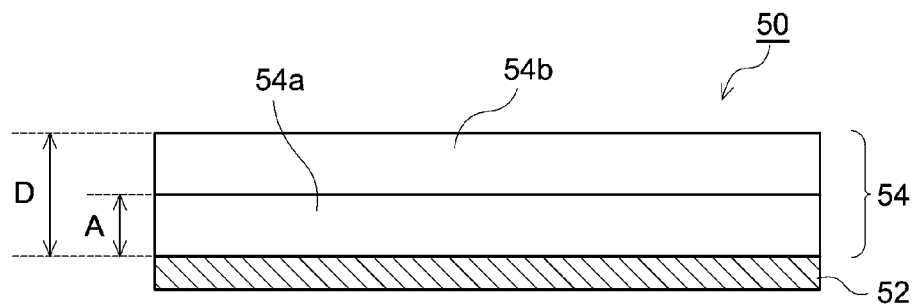
FIG. 1 is a schematic cross-sectional view showing a portion of an example of a positive electrode according to an embodiment of the present disclosure.

The following describes an embodiment according to the present disclosure with reference to the drawings. It should be noted that matter that is not referred to in the present specification and is necessary to implement the present disclosure can be grasped as design matter for those skilled in the art that is based on conventional technologies in the art. The present disclosure can be implemented based on the contents disclosed in the present specification and common technical knowledge in the art. Also, members and portions that have the same functions are denoted by the same reference signs in the drawings referred to below. Furthermore, dimensional relationships (lengths, widths, thicknesses, etc.) shown in the drawings do not reflect actual dimensional relationships.

It should be noted that the "secondary battery" referred to in the present specification is a term that means a power storage device that can be repeatedly charged and discharged, and encompasses so-called storage batteries and electricity storage elements such as electrical double layer capacitors. Also, in the present specification, the "lithium-ion secondary battery" refers to a secondary battery in which lithium ions are used as charge carriers and that can be charged and discharged through movement of charge that accompanies lithium ions between a positive electrode and a negative electrode.

The following specifically describes, as an example, an embodiment in which a positive electrode for a secondary battery disclosed herein is a positive electrode for a lithium-ion secondary battery, with reference to the drawings.

FIG. 1 is a schematic cross-sectional view showing a portion of a positive electrode according to the present embodiment. As shown in FIG. 1, a positive electrode 50 according to the present embodiment includes a positive-electrode current collector 52 and a positive-electrode active material layer 54 that is formed on the positive-electrode current collector 52. In the illustrated example, the positive-electrode active material layer 54 is only drawn on one surface of the positive-electrode current collector 52. The positive electrode 50 according to the present embodiment may include the positive-electrode active material layer 54 only on one surface of the positive-electrode current collector 52 or on both surfaces of the positive-electrode current collector 52. Also, the positive-electrode current collector 52 may include a current collecting portion (e.g., a positive-electrode-active-material-layer free portion 52a shown in FIG. 2) that extends to the outside of the positive-electrode active material layer 54 in a main surface direction of the positive-electrode active material layer 54.

The positive-electrode current collector 52 is typically a member that is made of metal and has good electrical conductivity. A sheet-shaped member such as a metal foil, a metal mesh, or a perforated metal sheet can be used as the positive-electrode current collector 52, for example. The positive-electrode current collector 52 is desirably a member that is made of aluminum or an aluminum alloy, and is more desirably an aluminum foil.

The positive-electrode active material layer 54 contains a positive-electrode active material. Known positive-electrode active materials that are used in lithium-ion secondary batteries can be used as the positive-electrode active material. More specifically, for example, lithium composite oxides, lithium transition metal phosphate compounds, and the like can be used as the positive-electrode active material. There is no particular limitation on the crystal structure of the positive-electrode active material, and the crystal structure may be a layered structure, a spinel structure, an olivine structure, or the like.

Desirable lithium composite oxides are lithium transition metal composite oxides that contain at least one transition metal element selected from Ni, Co, and Mn, and specific examples thereof include lithium nickel-based composite oxide, lithium cobalt-based composite oxide, lithium manganese-based composite oxide, lithium nickel manganese-based composite oxide, lithium nickel cobalt manganese-based composite oxide, lithium nickel cobalt aluminum-based composite oxide, and lithium iron nickel manganese-based composite oxide.

It should be noted that the "lithium nickel cobalt manganese-based composite oxide" referred to in the present specification is a term that encompasses oxides of which constituent elements are Li, Ni, Co, Mn, and O and oxides that contain one or two or more additional elements in addition to these elements. Examples of additional elements include transition metal elements and typical metal elements such as Mg, Ca, Al, Ti, V, Cr, Y, Zr, Nb, Mo, Hf, Ta, W, Na, Fe, Zn, and Sn. The additional elements may also be metalloid elements such as B, C, Si, and P and nonmetallic elements such as S, F, Cl, Br, and I. This also applies to the lithium nickel-based composite oxide, lithium cobalt-based composite oxide, lithium manganese-based composite oxide, lithium nickel manganese-based composite oxide, lithium nickel cobalt aluminum-based composite oxide, and lithium iron nickel manganese-based composite oxide described above.

Lithium nickel cobalt manganese-based composite oxide that has a composition expressed by the following formula (1) is desirable.

$$Li_{1+x}Ni_yCo_zMn_{(1-y-z)}M_\alpha O_{2-\beta}Q_\beta \quad (I)$$

(In formula (I), x, y, z, α, and β respectively satisfy: 0≤x≤0.7, 0.1<y<0.9, 0.1<z<0.4, 0≤α≤0.1, and 0≤β≤0.5. M is at least one element selected from the group consisting of Zr, Mo, W, Mg, Ca, Na, Fe, Cr, Zn, Sn, and Al. Q is at least one element selected from the group consisting of F, Cl, and Br. From the standpoint of energy density and thermal stability, it is desirable that y and z respectively satisfy: 0.3≤y≤0.5 and 0.20≤z<0.4.)

Examples of lithium transition metal phosphate compounds include lithium iron phosphate (LiFePO$_4$), lithium manganese phosphate (LiMnPO$_4$), and lithium manganese iron phosphate.

It is possible to use any one of or a combination of two or more of the positive-electrode active materials listed above.

There is no particular limitation on the average particle size (D50) of positive-electrode active material particles, but the average particle size is 0.05 μm or more and 20 μm or less, for example, desirably 1 μm or more and 15 μm or less, more desirably 3 μm or more and 12 μm or less, and further desirably 4 μm or more and 7 μm or less. It should be noted that the average particle size (D50) of positive-electrode active material particles can be determined using a laser diffraction scattering method, for example.

There is no particular limitation on the content of the positive-electrode active material, but the content of the positive-electrode active material in the positive-electrode active material layer 54 (i.e., relative to a total mass of the positive-electrode active material layer 54) is desirably at least 75 mass %, more desirably at least 80 mass %, and further desirably at least 85 mass %.

The positive-electrode active material layer 54 contains carbon nanotubes. Single-walled carbon nanotubes (SWNT), multiwalled carbon nanotubes (e.g., double-walled carbon nanotubes (DWNT)), and the like can be used as the carbon nanotubes. It is possible to use one type of carbon nanotubes or a combination of two or more types of carbon nanotubes. The carbon nanotubes can be one manufactured using an arc discharge method, a laser ablation method, a chemical vapor deposition method, or the like.

There is no particular limitation on the average length of the carbon nanotubes. When the average length of the carbon nanotubes is too long, dispersibility tends to degrade as a result of the carbon nanotubes agglomerating. Therefore, the average length of the carbon nanotubes is desirably no greater than 100 μm, more desirably no greater than 75 μm, and further desirably no greater than 50 μm. On the other hand, when the average length of the carbon nanotubes is short, a conductive path tends to be less formed between particles of the positive-electrode active material. Therefore, the average length of the carbon nanotubes is desirably at least 1 μm, more desirably at least 2 μm, and further desirably at least 3 μm.

There is no particular limitation on the average diameter of the carbon nanotubes, but the average diameter is desirably 0.1 nm or more and 30 nm or less, and more desirably 0.5 nm or more and 20 nm or less.

There is no particular limitation on the aspect ratio (i.e., a ratio expressed as: average length/average diameter) of the carbon nanotubes, but the aspect ratio is 500 or more and 10,000 or less, for example, and desirably 1,000 or more and 8,000 or less.

It should be noted that the average length and the average diameter of the carbon nanotubes can be determined by taking an electron micrograph of the carbon nanotubes and calculating average values of lengths and diameters of 100 or more carbon nanotubes, for example.

The positive-electrode active material layer 54 substantially does not contain a resin binder (e.g., a fluoro resin-based binder such as polyvinylidene fluoride; a rubber-based binder such as styrene-butadiene rubber; or an acrylic resin-based binder). It should be noted that, in the present specification, "substantially not containing a resin binder" means that the content of a resin binder in the positive-electrode active material layer 54 is less than 0.1 volume %, desirably less than 0.01 volume %, and more desirably the positive-electrode active material layer 54 does not contain a resin binder. That is, more desirably, the content of a resin binder in the positive-electrode active material layer 54 is 0 volume %.

The positive-electrode active material layer 54 may also contain components other than those described above so long as effects of the present disclosure are not significantly hindered. Examples of such components include lithium phosphate. Desirably, the positive-electrode active material layer 54 contains only the positive-electrode active material and a binder.

As shown in FIG. 1, in the positive electrode 50 according to the present embodiment, the positive-electrode active material layer 54 includes two regions. More specifically, the positive-electrode active material layer 54 includes a layer-like region 54a that is in contact with the positive-electrode current collector 52 and a region 54b (hereinafter also referred to as "the other region 54b") of the positive-electrode active material layer 54 other than the layer-like region 54a.

Both of the layer-like region 54a and the other region 54b contain carbon nanotubes and the positive-electrode active material. The content of carbon nanotubes in the layer-like region 54a is larger than the content of carbon nanotubes in the other region 54b. With this configuration, the ratio of carbon nanotubes is increased in the vicinity of the positive-electrode current collector 52, and contact points between the positive-electrode active material layer 54 and the positive-electrode current collector 52 can be increased. Accordingly, electron conductivity can be improved between the positive-electrode active material layer 54 and the positive-electrode current collector 52, i.e., in a portion that determines the rate of cell reaction. Furthermore, bonding between the positive-electrode active material layer 54 and the positive-electrode current collector 52 is enhanced owing to an anchoring effect between the positive-electrode current collector 52 and the carbon nanotubes, and the like, and thereby peeling strength between the positive-electrode active material layer 54 and the positive-electrode current collector 52 is increased. Therefore, this configuration reduces an initial resistance of the positive electrode 50 and suppresses an increase in resistance when charging and discharging are repeated.

The content of carbon nanotubes in the layer-like region 54a is not limited so long as the content is larger than the content of carbon nanotubes in the other region 54b, but when the content of carbon nanotubes in the layer-like region 54a is too small, there may be a risk of the effect of enhancing bonding between the positive-electrode current collector 52 and the positive-electrode active material layer 54 with the carbon nanotubes becoming weak. On the other hand, when the content of carbon nanotubes in the layer-like region 54a is too large, a content ratio of the positive-electrode active material decreases and surface reaction at the positive-electrode active material determines the resistance, and therefore there may be a risk of decreasing the resistance reducing effect. Therefore, the content of carbon nanotubes in the layer-like region 54a is at least 2 mass % and no greater than 15 mass %, for example, and desirably at least 3 mass % and no greater than 10 mass % from the standpoint of increasing the effect of reducing the resistance and increasing the effect of suppressing an increase in the resistance.

There is no particular limitation on the content of carbon nanotubes in the other region 54b so long as the content is smaller than the content of carbon nanotubes in the layer-like region 54a, but the content of carbon nanotubes in the other region 54b is, for example, at least 0.1 mass % and no greater than 1.5 mass %, and desirably at least 0.5 mass % and no greater than 1.2 mass %.

There is no particular limitation on the thickness (i.e., a dimension A shown in FIG. 1) of the layer-like region 54a. When the thickness of the layer-like region 54a is too small, there may be a risk of decreasing the effect of enhancing bonding between the positive-electrode active material layer 54 and the positive-electrode current collector 52, and there may be also a risk of decreasing the effect of improving conductivity because of a decrease in the volume of the region having high electron conductivity in the positive-electrode active material layer 54. On the other hand, when the thickness of the layer-like region 54a is too large, the content ratio of the positive-electrode active material decreases in the positive-electrode active material layer 54 as a whole, and surface reaction at the positive-electrode active material determines the resistance, and therefore, there may be a risk of decreasing the resistance reducing effect. Therefore, the thickness of the layer-like region 54a is, for example, at least 3% and no greater than 50% of the thickness (a dimension D shown in FIG. 1) of the positive-electrode active material layer 54. From the standpoint of increasing the effect of reducing the resistance and increasing the effect of suppressing an increase in the resistance, the thickness of the layer-like region 54a is desirably at least 5% and no greater than 20% of the thickness of the positive-electrode active material layer 54.

Such a positive-electrode active material layer 54 can be manufactured by preparing a paste for forming the layer-like region 54a that contains the positive-electrode active material and carbon nanotubes, and a paste for forming the other region 54b that contains the positive-electrode active material and carbon nanotubes, applying the paste for forming the layer-like region 54a on the positive-electrode current collector 52, drying the paste, then applying the paste for forming the other region 54b on the dried layer-like region 54a, drying the paste, and performing optional pressing.

The positive electrode 50 according to the present embodiment is to be used in a secondary battery, and desirably in a lithium-ion secondary battery. A secondary battery (in particular, a lithium-ion secondary battery) can be built using the positive electrode 50 according to the present embodiment, by using a known method. The secondary battery has a small initial resistance, and when the secondary battery is repeatedly charged and discharged, an increase in the resistance is suppressed.

In another aspect, a secondary battery disclosed herein is a secondary battery that includes the positive electrode 50 according to the present embodiment. The following describes, with reference to the drawings, an example configuration of a lithium-ion secondary battery that is an example of the secondary battery and in which the positive electrode 50 according to the present embodiment is used.

Figure 2:
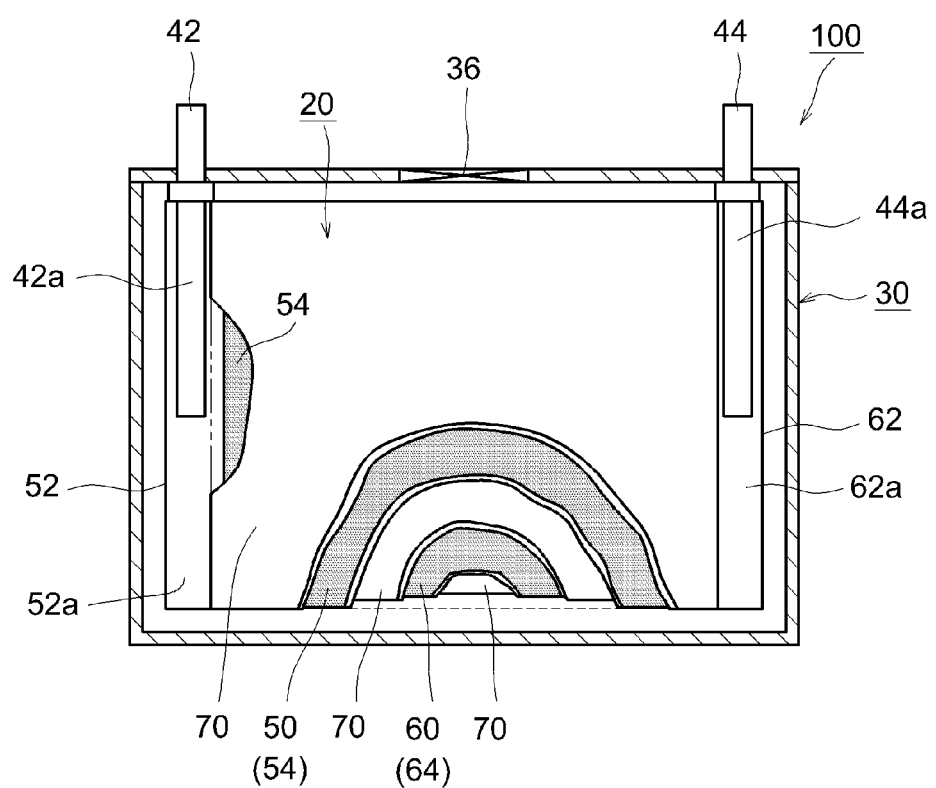
FIG. 2 is a cross-sectional view schematically showing a configuration of a lithium-ion secondary battery that is built using the positive electrode according to an embodiment of the present disclosure.

A lithium-ion secondary battery 100 shown in FIG. 2 is a sealed battery that is built by housing a wound electrode body 20 that has a flat shape and a non-aqueous electrolyte (not shown) in a flat rectangular battery case (i.e., an outer container) 30. The battery case 30 is provided with a positive electrode terminal 42 and a negative electrode terminal 44 for external connection and a thin safety valve 36 that is set so as to release internal pressure of the battery case 30 if the internal pressure has increased to be higher than or equal to a predetermined level. The positive electrode terminal 42 and the negative electrode terminal 44 are electrically connected to a positive-electrode current collecting plate 42a and a negative-electrode current collecting plate 44a, respectively. A metallic material, such as aluminum, that has light weight and good thermal conductivity is used as the material of the battery case 30, for example.

Figure 3:
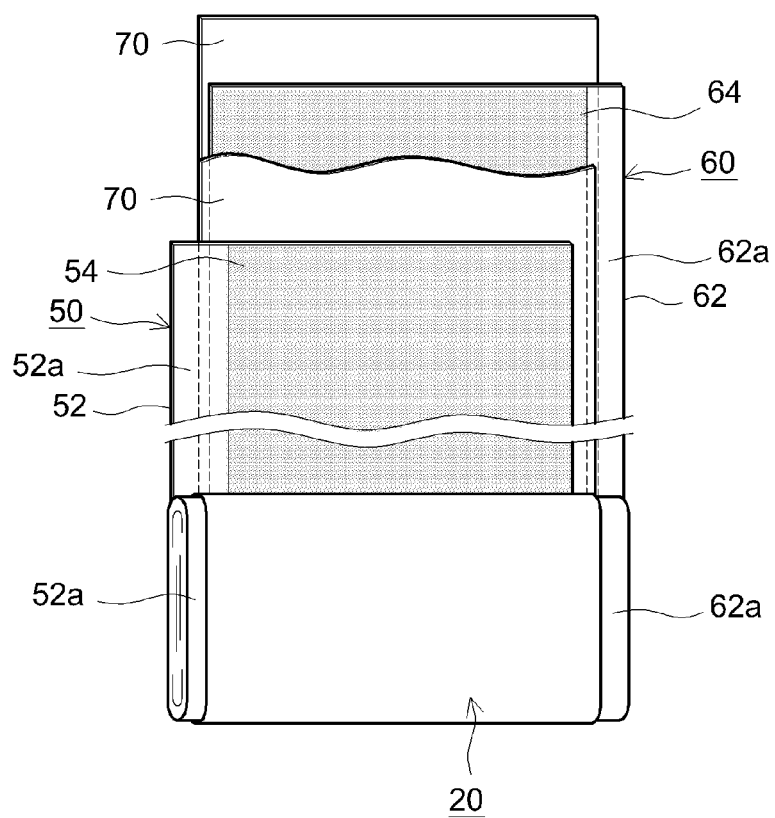
FIG. 3 is a schematic exploded view showing a configuration of a wound electrode body of a lithium-ion secondary battery that is built using the positive electrode according to an embodiment of the present disclosure.

As shown in FIGS. 2 and 3, the wound electrode body 20 has a configuration in which a positive electrode sheet 50 and a negative electrode sheet 60 are overlaid on each other and wound in a longitudinal direction with two elongated separator sheets 70 interposed between the positive electrode sheet and the negative electrode sheet. The positive electrode sheet 50 has a configuration in which the positive-electrode active material layer 54 is formed on one surface or both surfaces (in this example, both surfaces) of an elongated positive-electrode current collector 52 along the longitudinal direction. The negative electrode sheet 60 has a configuration in which a negative-electrode active material layer 64 is formed on one surface or both surfaces (in this example, both surfaces) of an elongated negative-electrode current collector 62 along the longitudinal direction. A positive-electrode-active-material-layer free portion 52a (i.e., a portion in which the positive-electrode active material layer 54 is not formed and the positive-electrode current collector 52 is exposed) and a negative-electrode-active-material-layer free portion 62a (i.e., a portion in which the negative-electrode active material layer 64 is not formed and the negative-electrode current collector 62 is exposed) are formed so as to extend outward from respective ends of the wound electrode body 20 in a winding axis direction (i.e., a sheet width direction that is orthogonal to the longitudinal direction described above). The positive-electrode current collecting plate 42a and the negative-electrode current collecting plate 44a are bonded to the positive-electrode-active-material-layer free portion 52a and the negative-electrode-active-material-layer free portion 62a, respectively.

The positive electrode 50 according to the present embodiment described above is used as the positive electrode sheet 50. Examples of the negative-electrode current collector 62 constituting the negative electrode sheet 60 include a copper foil. The negative-electrode active material layer 64 contains a negative-electrode active material. Carbon materials such as graphite, hard carbon, and soft carbon can be used as the negative-electrode active material, for example. The negative-electrode active material layer 64 can further contain a binder, a thickener, or the like. Styrene-butadiene rubber (SBR) or the like can be used as the binder, for example. Carboxymethyl cellulose (CMC) or the like can be used as the thickener, for example.

Various types of microporous sheets that are the same as or similar to those conventionally used in lithium-ion secondary batteries can be used as the separators 70, and examples of such microporous sheets include a microporous resin sheet that is made of resin such as polyethylene (PE) or polypropylene (PP). Such a microporous resin sheet may have a single-layer structure or a multilayer structure including two or more layers (e.g., a three-layer structure in which PP layers are layered on respective surfaces of a PE layer). The separators 70 may each include a heat resistant layer (HRL).

Non-aqueous electrolyte solutions that are the same as or similar to those used in conventional lithium-ion secondary batteries can be used as the non-aqueous electrolyte solution, and typically, a non-aqueous electrolyte solution that contains a supporting electrolyte in an organic solvent (non-aqueous solvent) can be used. Organic solvents such as various types of carbonates, ethers, esters, nitriles, sulfones, and lactones that are used in electrolyte solutions of common lithium-ion secondary batteries can be used as the non-aqueous solvent, with no particular limitation. Specific examples of non-aqueous solvents include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC). It is possible to use any one of or a combination of two or more such non-aqueous solvents. As the supporting electrolyte, lithium salts such as $LiPF_6$, $LiBF_4$, and $LiClO_4$ (desirably, $LiPF_6$) can be desirably used, for example. The concentration of the supporting electrolyte is desirably at least 0.7 mol/L and no greater than 1.3 mol/L.

It should be noted that the non-aqueous electrolyte solution described above can contain various additives, for example: a gas generating agent such as biphenyl (BP) or cyclohexylbenzene (CHB); a film forming agent such as an oxalato complex compound that contains a boron atom and/or a phosphorus atom, or vinylene carbonate (VC); a dispersing agent; or a thickener, so long as the effects of the present disclosure are not significantly hindered.

The lithium-ion secondary battery 100 has a small initial resistance, and when the lithium-ion secondary battery 100 is repeatedly charged and discharged, an increase in the resistance is suppressed.

The lithium-ion secondary battery 100 can be used for various uses. For example, the lithium-ion secondary battery 100 can be suitably used for driving power supplies that are installed in vehicles such as electric vehicles (EVs), hybrid vehicles (HVs), plug-in hybrid vehicles (PHVs), and the like. Also, the lithium-ion secondary battery 100 can be used as a storage battery of a small-sized power storage device or the like. The lithium-ion secondary battery 100 can also be used in the form of a battery pack in which typically a plurality of lithium-ion secondary batteries are connected in series and/or in parallel.

It should be noted that the lithium-ion secondary battery 100 that includes the flat-shaped wound electrode body 20 and has a rectangular shape has been described as an example. However, the lithium-ion secondary battery can also be configured as a lithium-ion secondary battery that includes a stacked type electrode body (i.e., an electrode body in which a plurality of positive electrodes and a plurality of negative electrodes are alternately stacked). Also, the lithium-ion secondary battery can be configured as a cylindrical lithium-ion secondary battery or a laminate-cased lithium-ion secondary battery. It is also possible to obtain a secondary battery (in particular, a non-aqueous electrolyte secondary battery) other than lithium-ion secondary batteries using the positive electrode 50 according to the present embodiment, by using a known method.

The following describes examples relating to the present disclosure in detail, but the following description is not intended to limit the present disclosure to the examples.

Manufacture of Positive Electrode: Examples 1 to 9 and Comparative Examples 3 and 5

A paste for forming a layer A was prepared by mixing $LiNi_{1/3}Co_{1/3}Mn_{1/3}O_2$, which was positive-electrode active material powder, and carbon nanotubes (CNT) in N-methylpyrrolidone such that the content of carbon nanotubes was as shown in Table 1.

Next, a paste for forming a layer B was prepared by mixing $LiNi_{1/3}Co_{1/3}Mn_{1/3}O_2$ and carbon nanotubes (CNT) in N-methylpyrrolidone such that the content of carbon nanotubes was as shown in Table 1.

The layer A was formed by applying the paste for forming the layer A in a band shape on an aluminum foil that had a thickness of 15 μm and drying the paste. Then, the layer B was formed by applying the paste for forming the layer B on the layer A and drying the paste. At this time, these pastes were applied such that a ratio between the thickness of the layer A and the thickness of the layer B was as shown in Table 1. Also, a total thickness of the layer A and the layer B was set to be the same between examples 1 to 9 and comparative examples 3 and 5. Thus, positive electrodes of the examples 1 to 9 and the comparative examples 3 and 5 in which the layer A and the layer B were formed in this order on a positive-electrode current collector were obtained.

Manufacture of Positive Electrode: Comparative Examples 1 and 2

A paste for forming the layer A was prepared by mixing $LiNi_{1/3}Co_{1/3}Mn_{1/3}O_2$ and carbon nanotubes (CNT) in N-methylpyrrolidone such that the content of carbon nanotubes was as shown in Table 1. Only the layer A was formed on an aluminum foil that had a thickness of 15 μm using only the paste for forming the layer A, in a manner similar to the manner described above. The thickness of the layer A was set to be the same as the total thickness of the layers A and B in the example 1. Thus, positive electrodes of comparative examples 1 and 2 were obtained.

Manufacture of Positive Electrode: Comparative Example 4

A paste for forming the layer A was prepared by mixing $LiNi_{1/3}Co_{1/3}Mn_{1/3}O_2$, carbon nanotubes (CNT), and polyvinylidene fluoride (PVDF) in N-methylpyrrolidone such that contents of carbon nanotubes and polyvinylidene fluoride were as shown in Table 1.

A paste for forming the layer B was prepared by mixing $LiNi_{1/3}Co_{1/3}Mn_{1/3}O_2$ (LNCM), carbon nanotubes (CNT), and polyvinylidene fluoride (PVDF) in N-methylpyrrolidone such that contents of carbon nanotubes and polyvinylidene fluoride were as shown in Table 1.

A positive electrode of a comparative example 4 in which the layer A and the layer B were formed in this order on an aluminum foil that had a thickness of 15 μm was obtained using the paste for forming the layer A and the paste for forming the layer B, in a manner similar to the manner described above. Thicknesses of the layer A and the layer B were set to be the same as thicknesses of the layer A and the layer B in the example 1.

Measurement of Peeling Strength of Positive Electrode

The positive electrodes of the examples and the comparative examples were each cut into a strip of 1 mm×20 mm to 30 mm, and the positive-electrode active material layer was affixed to a base for a peeling strength test. A load was applied by pulling the aluminum foil using an autograph precision universal testing machine to measure peeling strength (N/m).

Manufacture of Evaluation Battery

A paste for forming a negative-electrode active material layer was prepared by mixing natural graphite (C), which was a negative-electrode active material, styrene-butadiene rubber (SBR), which was a binder, and carboxymethyl cellulose (CMC), which was a thickener, at a mass ratio of C:SBR:CMC=98:1:1 in ion exchanged water. A negative electrode sheet was prepared by applying the paste on a copper foil that had a thickness of 10 μm, drying the paste, and then performing pressing. Also, a porous polyolefin sheet that had a three-layer structure constituted by PP/PE/PP and a thickness of 20 μm was prepared as a separator sheet.

The positive electrode sheet of each of the examples and the comparative examples, the negative electrode sheet, and the separator sheet were overlaid on each other, electrode terminals were attached thereto, and the resultant was housed in a laminate case. Then, a non-aqueous electrolyte solution was poured into the laminate case, and the laminate case was sealed in an airtight manner. It should be noted that the non-aqueous electrolyte solution was obtained by dissolving $LiPF_6$, which was a supporting electrolyte, at a concentration of 1.0 mol/L in a mixed solvent that contained ethylene carbonate (EC), dimethyl carbonate (DMC), and ethyl methyl carbonate (EMC) at a volume ratio of 3:4:3. Thus, lithium-ion secondary batteries for evaluation of the examples and the comparative examples, which had a capacity of 10 mAh, were obtained.

Measurement of Initial Resistance

Each lithium-ion secondary battery for evaluation was placed in an environment of 25° C. after SOC (State Of Charge) was adjusted to 50%. The lithium-ion secondary battery was discharged for 10 seconds with a current value of 100 mA, and a voltage value was measured when 10 seconds elapsed from the start of discharging to calculate an initial battery resistance. Taking the resistance of the lithium-ion secondary battery for evaluation of the comparative example 1 to be 100, ratios of resistances of the other lithium-ion secondary batteries for evaluation were determined (that is, the ratios were calculated as percentages). Results are shown in Table 1.

Evaluation of Resistance Increase Ratio after Cycles

Each lithium-ion secondary battery for evaluation was placed in an environment of 60° C., and charging and discharging cycles were repeated 200 times, each cycle being carried out by performing constant-current charging at 1 C until the voltage reached 4.1 V, and performing constant-current discharging at 1 C until the current reached 3.0 V. Thereafter, a battery resistance after the 200 cycles was determined using the same method as that used in the measurement of the initial resistance. A resistance increase ratio (%) was calculated as follows: (battery resistance after 200 charging and discharging cycles/initial resistance)×100. Results are shown in Table 1.

TABLE 1

| | Layer A | | Layer B | | PVDF content (volume %) | Peeling strength (N/m) | Initial resistance ratio | Resistance increase ratio (%) after cycles |
| --- | --- | --- | --- | --- | --- | --- | --- | --- |
| | CNT content (mass %) | Thickness ratio | CNT content (mass %) | Thickness ratio | | | | |
| Example 1 | 2 | 50 | 1 | 50 | <0.1 | 15 | 80 | 120 |
| Example 2 | 3 | 50 | 1 | 50 | <0.1 | 20 | 75 | 115 |
| Example 3 | 5 | 50 | 1 | 50 | <0.1 | 25 | 70 | 112 |
| Example 4 | 10 | 50 | 1 | 50 | <0.1 | 30 | 75 | 115 |
| Example 5 | 15 | 50 | 1 | 50 | <0.1 | 35 | 80 | 120 |
| Example 6 | 5 | 3 | 1 | 97 | <0.1 | 20 | 70 | 112 |
| Example 7 | 5 | 5 | 1 | 95 | <0.1 | 25 | 65 | 105 |
| Example 8 | 5 | 20 | 1 | 80 | <0.1 | 25 | 68 | 110 |
| Example 9 | 5 | 30 | 1 | 70 | <0.1 | 25 | 70 | 112 |
| Comparative example 1 | 1 | 100 | — | — | <0.1 | 10 | 100 | 150 |
| Comparative example 2 | 2 | 100 | — | — | <0.1 | 10 | 100 | 150 |
| Comparative example 3 | 1 | 50 | 2 | 50 | <0.1 | 10 | 100 | 150 |
| Comparative example 4 | 4 | 50 | 1 | 50 | 0.1 | 20 | 100 | 150 |
| Comparative example 5 | 4 | 50 | 0 | 50 | <0.1 | 10 | 100 | 150 |

From the results shown in Table 1, it can be found that the initial resistance was small and the resistance increase ratio was small in cases where both of the layers A and B contained carbon nanotubes and the content of carbon nanotubes in the layer A was larger than the content of carbon nanotubes in the layer B. Therefore, it can be understood that, according to the positive electrode for a secondary battery disclosed herein, it is possible to provide a positive electrode of which an initial resistance is small, and that suppresses an increase in resistance when charging and discharging are repeated.

Although specific examples of the present disclosure have been described in detail, these examples are merely for illustrative purpose and do not limit the claims. A technology described in the claims encompasses various alterations and modifications of the specific examples described above.

What is claimed is:

1. A positive electrode for a lithium-ion secondary battery, comprising:
    a positive-electrode current collector; and
    a positive-electrode active material layer that is provided on the positive-electrode current collector, wherein
    the positive-electrode active material layer contains a positive-electrode active material and carbon nanotubes, and substantially does not contain a resin binder,
    the positive-electrode active material includes a lithium composite oxide or a lithium transition metal phosphate compound,
    the positive-electrode active material layer includes a layer-like region that is in contact with the positive-electrode current collector, and a region other than the layer-like region,
    both of the layer-like region and the region other than the layer-like region contain carbon nanotubes, and
    a content of carbon nanotubes in the layer-like region is larger than a content of carbon nanotubes in the region other than the layer-like region.

2. The positive electrode for a lithium-ion secondary battery according to claim 1, wherein
    the content of carbon nanotubes in the layer-like region is at least 3 mass % and no greater than 10 mass %.

3. The positive electrode for a lithium-ion secondary battery according to claim 1, wherein
    a thickness of the layer-like region is at least 5% and no greater than 20% of a thickness of the positive-electrode active material layer.

4. A lithium-ion secondary battery comprising the positive electrode for a lithium-ion secondary battery according to claim 1.

* * * * *